United States Patent [19]
Weigand et al.

[11] Patent Number: 5,702,187
[45] Date of Patent: Dec. 30, 1997

[54] GUIDE RING FOR ROLLER BEARING

[75] Inventors: Michael Weigand, Elferehausen; Werner Ganss, Schweinfurt; Martin Grehn, Dittelbrunn, all of Germany

[73] Assignee: FAG OEM und Handel AG, Germany

[21] Appl. No.: 789,305

[22] Filed: Jan. 23, 1997

[30] Foreign Application Priority Data

Jan. 24, 1996 [DE] Germany .................. 196 02 372.6

[51] Int. Cl.⁶ ........................................ F16C 33/58
[52] U.S. Cl. ...................... 384/551; 384/564; 384/572
[58] Field of Search .................... 384/520, 523, 384/551, 560, 568, 570, 572, 564

[56] References Cited

U.S. PATENT DOCUMENTS

| | | | |
|---|---|---|---|
| 1,906,259 | 5/1933 | Gibbons | 384/564 |
| 2,029,265 | 1/1936 | Kylen | 384/564 |
| 3,547,504 | 12/1970 | Bobowicz et al. | 384/558 |
| 5,474,388 | 12/1995 | Kellstrom et al. | 384/572 X |

*Primary Examiner*—Thomas R. Hannon
*Attorney, Agent, or Firm*—Ostrolenk, Faber, Gerb & Soffen, LLP

[57] ABSTRACT

An antifriction bearing having one or two rows of rolling bodies has at least one guide ring guided on the outside ring race for guidance of the rollers and/or of the separator. The guide ring comprises two partial circumference ring segments which are arranged loosely between or adjacent one or each of the rows of rolling bodies and are held in form-locked manner in the spherical surface of the outer ring due to resilience of the ring segments.

17 Claims, 3 Drawing Sheets

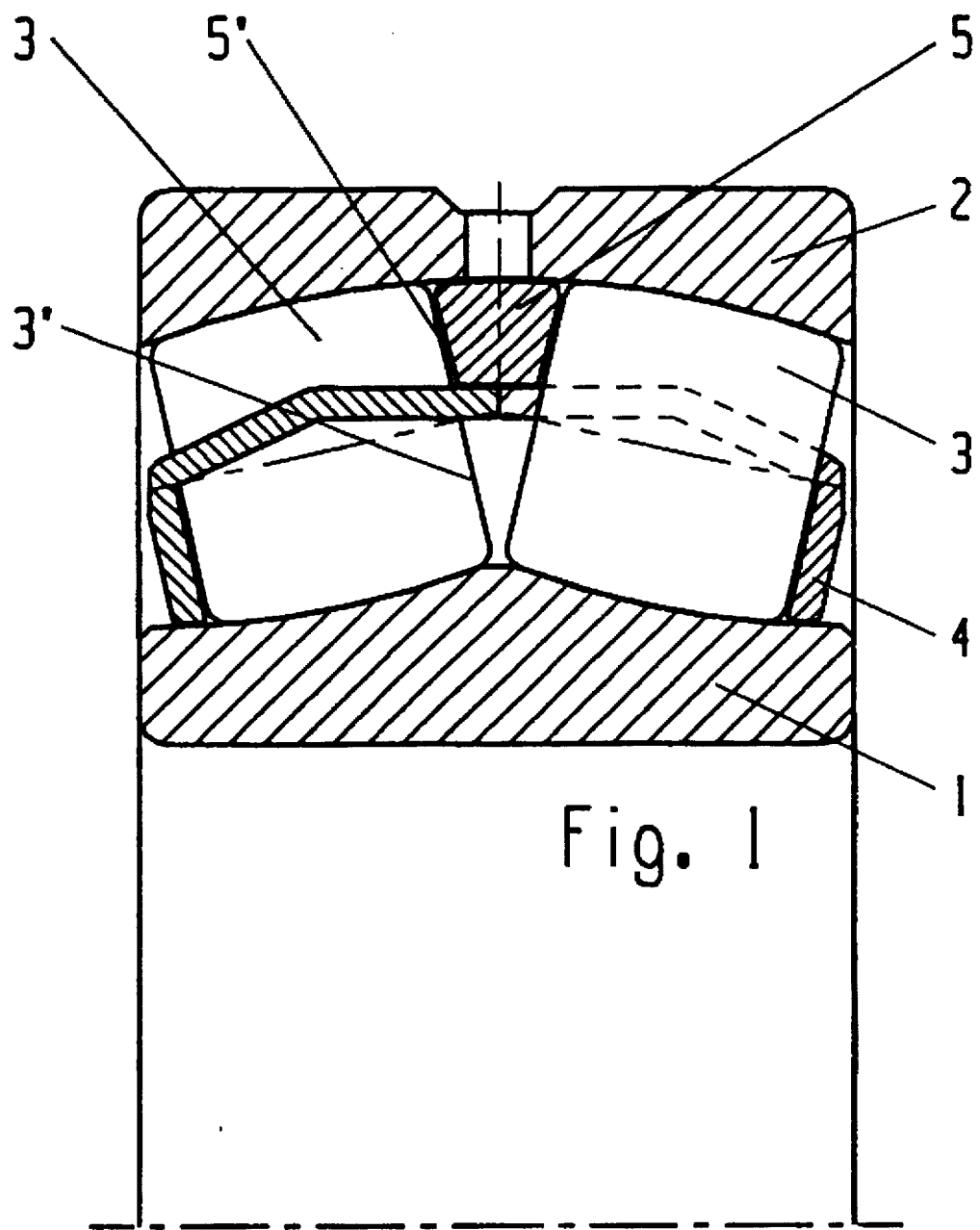

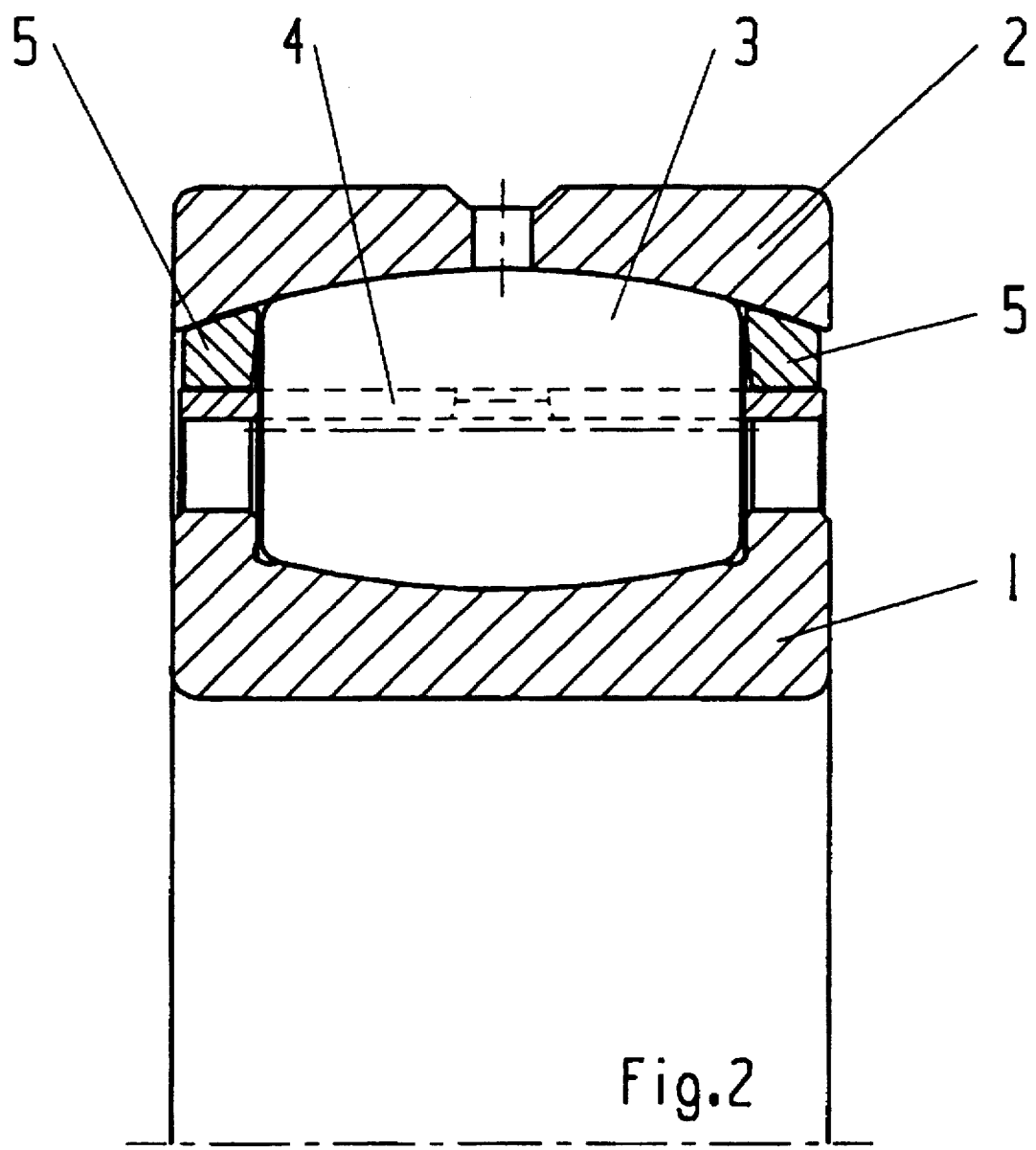

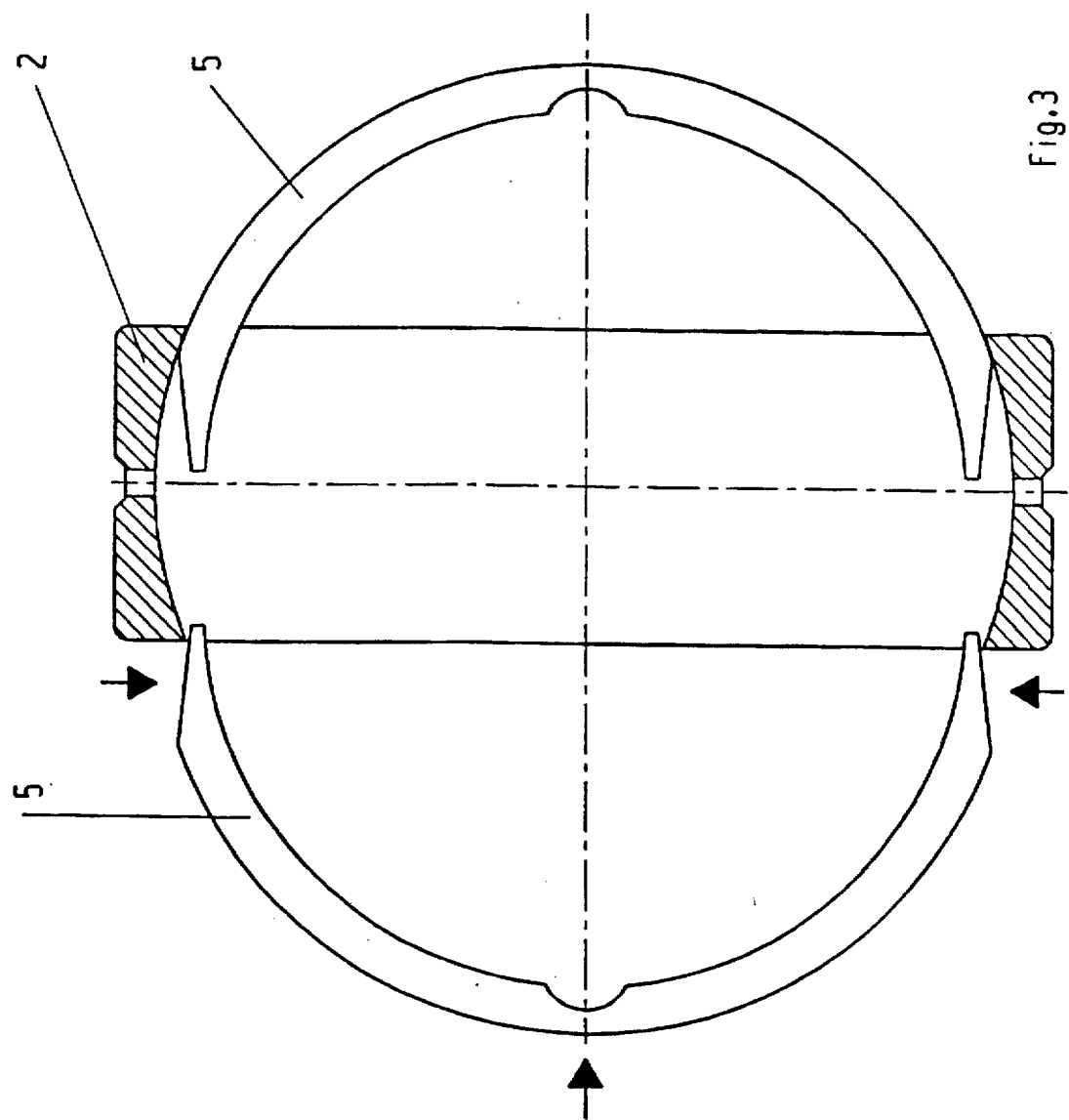

GUIDE RING FOR ROLLER BEARING

BACKGROUND OF THE INVENTION

The present invention relates to an antifriction roller bearing and particularly to a segmented guide ring for the rolling bodies of the bearing. The invention has particular application to a bearing with a raceway that is curved in the axial direction, like a spherical roller bearing or a barrel roller bearing.

Spherical roller bearings, are known, for instance, from Federal Republic of Germany Patent 594 993. To enable a guide ring of the bearing to be introduced into the spherical outer race, the guide ring is flattened at two opposite places. These flattenings, both increase the cost of manufacture and limit the design, particularly in the case of wide bearing rings, since a minimum cross section must be present on the key surfaces. Furthermore, a guide ring, which had been previously inserted in the outer ring, impedes the assembly of the bearing, particularly when using automatic assembly devices. This is true also for a spherical roller bearing like that shown in Federal Republic of Germany Utility Model 87 02 071.

EP 0 051 083 B1 shows a metal window cage or separator for rimless spherical roller bearings. The outside diameter of the cage is provided with indentations in order to enable it to be introduced into the bearing. But this also increases the cost of the separator. Furthermore, this solution has the disadvantage that the entire differential speed between the separator cage and outer ring causes wear of the separator.

U.S. Pat. No. 1,906,259 further discloses a double-row spherical roller bearing having a groove in its outer ring. A slit lock ring is inserted into that groove as it is intended to limit the swinging out of the bearing. No guide function is provided for the separator or rollers.

Finally, Federal Republic of Germany Patent 33 41 866 discloses a spherical roller bearing including a guide ring having an outer part and an inner part. The outer part of the guide ring includes several segments which are individually fastened on the outer side of the inner part. This is a difficult and expensive construction. This is also the case with the embodiment in which the outer part of the guide ring is formed from segments which are connected to each other by rivets.

SUMMARY OF THE INVENTION

The objects of the present invention include providing an antifriction bearing which avoids the above disadvantages, which may be inexpensively manufactured and which may be simply mounted even on a completely preassembled bearing in which the separators and rollers have already been introduced. The separator construction is not impeded by minimum cross sections, particularly in the case of wide bearings. Good kinematics of the bearing are assured. An antifriction bearing having one or two rows of rolling bodies has at least one guide ring guided on the outside ring race for guidance of the rollers and/or of the separator. The guide ring comprises two partial circumference ring segments which are arranged loosely between or adjacent one or each of the rows of rolling bodies and are held in form-locked manner in the spherical surface of the outer ring due to resilience of the ring segments.

The invention concerns a guide ring comprised of at least two ring segments which are arranged loosely either between or alongside the rows of rollers and which are held in form locked manner against the race or surface of one of the rings, e.g., the curved surface or the spherical surface, preferably of the outer ring of the bearing. The holding is due to the normal self bias of the guide ring segments toward the bearing ring with which the guide ring is form locked. The invention provides an inexpensive, easily mounted construction, dependably guides the rolling bodies and/or of the separator and prevents the bearing parts (separator, rollers) from dropping out when the inner ring is swung out. Also, the danger that the guide ring may jam in the inner ring is avoided by providing two separate guide ring segments or halves and a good mediation of the sliding speeds is obtained.

The guide ring segments or halves may be made of steel, non-ferrous metal or plastic. The guide ring can be used in radial spherical roller bearings, or in single row barrel roller bearings or in self aligning ball bearings.

It has been found that the self biased, resilient guide ring halves which are sprung into the space between the rings by being deformed for installation against the spherical surface of the outer ring race, give a dependable, form locked construction of the bearing even without the ring halves being connected to each other. The concept of the invention, would also include the guide ring halves being elastic or sprung inward against the inner ring.

Other features and advantages of the present invention will become apparent from the following description of the invention which refers to the accompanying drawings.

BRIEF DESCRIPTION OF THE DRAWINGS

FIG. 1 shows a cross section through a two-row, radial spherical roller bearing with separator, rollers and guide ring;

FIG. 2 shows a cross section through single row, barrel roller bearing with separator, rollers and guide rings which are arranged on both sides of the rollers; and FIG. 3 shows the introduction of the guide ring halves into a spherical roller bearing outer ring without the separator and the rollers having previously been mounted in the outer ring.

DETAILED DESCRIPTION OF EMBODIMENTS OF THE INVENTION

FIG. 1 shows a two row spherical roller bearing. The bearing includes an inner ring 1 and an outer ring 2. Spherical bearing rollers 3 between the rings 1 and 2 are spaced apart from each other by a separator or cage 4. The separator can also be developed in two parts, i.e., a respective separator part can be provided for each row of rollers.

A guide ring 5 between the two rows of rollers rests against the roller race of the outer ring 2. The guide ring 5 is divided into two separate, partial circumference ring segments or halves. Each ring segment extends around the bearing an angular distance of about 160° to about 180°. They are positioned so that they do not at all overlap circumferentially, as seen in FIG. 3, or the segments may at most only partially overlap, i.e., they may occupy different respective circumferential regions around the bearing. The guide ring 5 sits alongside of and may loosely contact the separator to center the separator 4 to assure good travel. The guide ring may contact the rollers and can also serve as a run-on surface for the rollers 3. The end surfaces 3' of the rollers 3 and the run-on surfaces 5' of the guide rings 5 are approximately parallel.

The bearing in FIG. 2 is a single row bearing with barrel rollers contacting the outer and inner ring races. It includes an inner bearing ring 1, an outer bearing ring 2, one row of barrel shaped rollers 3 between the races of the rings, and the separator 4 for spacing the rollers. A respective two segment guide ring 5 is arranged to the right and left alongside the rollers 3. The rings 5 guide the separator 4 and/or the rollers 3.

In order to enable introduction of the guide ring halves 5 into the spherical bearing outer ring 2, they are resilient and slightly sprung radially outwardly, as shown in FIG. 3, which is readily possible in view of their geometry. The separate ring halves are deformable to be installed into the ring 2. Once initially installed, the guide ring halves are rotated from their initial transverse orientation shown in FIG. 3 to align with and be inside the outer ring. The ring halves 5 then resiliently press outward and are held in form-locked manner in the outer ring race.

In order to facilitate introduction of the guide ring halves, the opposite ends of each ring segment or half can be flattened. Further bend points, in the form of reductions in cross section of the segments, may be provided. These points are strong enough for the ring halves to be self biased outwardly.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An antifriction bearing comprising:
   an inner ring, an outer ring, the rings having opposing races;
   at least one row of rolling bodies between the rings and shaped for engaging and rolling along the races;
   a separator in the space between the races and separating the rolling bodies;
   at least one guide ring in the space between the inner and outer races and shaped to be guided on one of the ring races for guiding at least one of the rows of rolling bodies and the separator;
   the guide ring comprising at least two ring segments, each ring segment being of a length less than the entire circumference of the bearing and the segments being positioned in the bearing so as to not be entirely overlapping circumferentially; the ring segments being arranged loosely along at least one lateral side of the rolling bodies in the at least one row, and the ring segments being shaped and sized to be held in form locked manner to the surface of the one ring race.

2. The antifriction bearing of claim 1, wherein each ring segment is elastically deformable for mounting.

3. The antifriction bearing of claim 1, wherein the one race is curved inwardly toward the other race.

4. The antifriction bearing of claim 1, wherein the guide ring is shaped and normally self biased outwardly to engage the outer ring race.

5. The antifriction bearing of claim 4, wherein the ring segments snap into the outer race and the outer ring.

6. The antifriction bearing of claim 4, wherein the ring segments have opposite ends; the opposite ends of each of the ring segments are generally flattened and not rounded at the outer race.

7. The antifriction bearing of claim 4, wherein each of the ring segments has at least one bend point along its length at which the ring segment is more easily deformed than elsewhere along the ring segment.

8. The antifriction bearing of claim 7, wherein the bend point at the ring segment is defined by a reduced cross section region of the ring segment.

9. The antifriction bearing of claim 1, wherein each ring segment covers a circumferential angle of between about 160° and 180°.

10. The antifriction bearing of claim 9, wherein the respective ring segments are at least in part at different circumferential regions around the bearing rings.

11. The antifriction bearing of claim 1, wherein the respective ring segments are at least in part at different circumferential regions around the bearing rings.

12. The antifriction bearing of claim 11, wherein the ring segments extend around different non-overlapping circumferential regions of the bearing.

13. The antifriction bearing of claim 1, wherein the ring segments are made of hardened steel.

14. The antifriction bearing of claim 1, wherein the guide ring comprises two ring segments, arranged loosely alongside one of the rows of rolling bodies.

15. An antifriction bearing comprising:
   an inner ring and an outer ring, the outer ring having a spherical curvature race, the inner ring having two neighboring respective spherical races defining two laterally neighboring rows around the inner ring;
   a respective row of spherical roller bearing rolling bodies between each of the inner ring races and the outer ring race and the rolling bodies engaging and rolling along the respective inner race and the outer race;
   a separator in the space between the inner and the outer races separating the rolling bodies;
   at least one guide ring in the space between the inner and outer races shaped and positioned to be guided on the outer ring race for guiding at least one of the rolling bodies and the separator;
   the guide ring comprising at least two ring segments, each ring segment being of a length less than the entire circumference of the bearing and the segment being positioned in the bearing so as to not be entirely overlapping circumferentially; the ring segments being arranged loosely along at least one lateral side of the rolling bodies in the at least one row, and the ring segments being shaped and sized to be held in form locked manner to the spherical curve surface of the outer race.

16. The antifriction bearing of claim 15, wherein the guide ring is disposed between the two rows of the rolling bodies.

17. The antifriction bearing of claim 16, wherein each ring segment is elastically deformable for mounting and the ring segments snap into the outer race and the outer ring.

* * * * *